US008310935B1

(12) United States Patent
Chakravorty (10) Patent No.: US 8,310,935 B1
(45) Date of Patent: Nov. 13, 2012

(54) COMMUNICATIONS FAILURE RECOVERY IN DATA PACKET NETWORKS BASED ON FAST DETERMINATION OF ALTERNATE ROUTES

(75) Inventor: Sham Chakravorty, McLean, VA (US)

(73) Assignee: Signafor, Inc., Dunn Loring, VA (US)

( * ) Notice: Subject to any disclaimer, the term of this patent is extended or adjusted under 35 U.S.C. 154(b) by 1431 days.

(21) Appl. No.: 10/175,317

(22) Filed: Jun. 20, 2002

(51) Int. Cl.
*H04L 12/26* (2006.01)

(52) U.S. Cl. ........................... 370/238; 370/218
(58) Field of Classification Search .................... 370/238
See application file for complete search history.

(56) References Cited

U.S. PATENT DOCUMENTS

| | | | | |
|---|---|---|---|---|
| 6,400,681 B1* | 6/2002 | Bertin et al. | | 370/218 |
| 6,493,318 B1* | 12/2002 | Bare | | 370/238 |
| 6,633,544 B1* | 10/2003 | Rexford et al. | | 370/238 |
| 6,778,502 B2* | 8/2004 | Ricciulli | | 370/238 |
| 6,836,463 B2* | 12/2004 | Garcia-Luna-Aceves et al. | | 370/238 |
| 6,836,465 B2* | 12/2004 | Rajan et al. | | 370/238 |
| 6,996,065 B2* | 2/2006 | Kodialam et al. | | 370/238 |
| 7,042,837 B1* | 5/2006 | Cassiday et al. | | 370/225 |
| 7,075,892 B2* | 7/2006 | Grover et al. | | 370/238 |
| 7,099,341 B2* | 8/2006 | Lingafelt et al. | | 370/401 |
| 7,124,187 B1* | 10/2006 | Kodialam et al. | | 709/226 |
| 7,200,117 B2* | 4/2007 | Chiu et al. | | 370/238 |
| 7,310,349 B2* | 12/2007 | Beshai | | 370/428 |
| 7,362,709 B1* | 4/2008 | Hui et al. | | 370/237 |
| 7,688,720 B2* | 3/2010 | Doverspike et al. | | 370/228 |
| 2002/0131424 A1* | 9/2002 | Suemura | | 370/400 |
| 2002/0167898 A1* | 11/2002 | Thang et al. | | 370/216 |
| 2002/0172157 A1* | 11/2002 | Rhodes | | 370/238 |

* cited by examiner

*Primary Examiner* — Michael J Moore, Jr.
(74) *Attorney, Agent, or Firm* — McDermott Will & Emery LLP (57) ABSTRACT

Data communications system for handling IP packets have a route evaluation mechanism for determining a least cost route for delivery a packet to a destination, and an alternate route evaluation mechanism for evaluating possible routes for packet delivery having cost different from the cost of the least cost route. In response to evaluation performed by the alternate route evaluation mechanism, an alternate route table generator produces an alternate route table containing alternate routes for delivery of the packet to the destination. A fast failure recovery algorithm is carried out to determine entries in the alternate route table.

23 Claims, 6 Drawing Sheets

Flow Diagram for the Algorithm

Figure 1. Flow Diagram for the Algorithm

Figure 2. Representative Six Router Configuration

| Primary Route Table | | | Initial Alternate Route Table | | |
|---|---|---|---|---|---|
| Destination | Cost | Gateway | Destination | Cost | Gateway |
| A | 1 | A | A | 1 | A |
| B | 1 | B | B | 1 | B |
| D | 1 | D | D | 1 | D |
| E | 1 | E | E | 1 | E |
| F | 2 | D,E | F | 2 | D,E |
| X | 2 | A | X | 2 | A |
| Y | 3 | D,E | Y | 3 | D,E |

Figure 3. Representative Primary and initial Alternate Route Tables

Figure 4. Representative Six Router Configuration for First Working Alternative

| Resulting Alternate Route Table | | | Working Route Table for "1" | | |
|---|---|---|---|---|---|
| Destination | Cost | Gateway | Destination | Cost | Gateway |
| A | 1 | A | A | 1 | A |
| B | 2 | A | B | 2 | A |
| D | 3 | A | D | 3 | A |
| E | 3 | A | E | 3 | A |
| F | 4 | A | F | 4 | A |
| X | 2 | A | X | 2 | A |
| Y | 5 | A | Y | 5 | A |

Figure 5. Representative Working Route Table for "1" and resulting Alternate Route Table Figure 6. Representative Six Router Configuration for Second Working Alternative

| Resulting Alternate Route Table | | | Working Route Table for "2" | | |
| --- | --- | --- | --- | --- | --- |
| Destination | Cost | Gateway | Destination | Cost | Gateway |
| A | 2 | B | A | 2 | B |
| B | 2 | A | B | 1 | B |
| D | 2 | B | D | 2 | B |
| E | 2 | B | E | 2 | B |
| F | 3 | B | F | 3 | B |
| X | 3 | B | X | 3 | B |
| Y | 4 | B | Y | 4 | B |

Figure 7. Representative Working Route Table for "2" and the Resulting Alternate Route Table

| Primary Route Table |||
|---|---|---|
| Destination | Cost | Gateway |
| A | 1 | A |
| B | 1 | B |
| D | 1 | D |
| E | 1 | E |
| F | 2 | D,E |
| X | 2 | A |
| Y | 3 | D,E |

| Final Alternate Route Table |||
|---|---|---|
| Destination | Cost | Gateway |
| A | 2 | B |
| B | 2 | A |
| D | 2 | B |
| E | 2 | B |
| F | 3 | B |
| X | 3 | B |
| Y | 4 | B |

Figure 8. Representative Primary and final Alternate Route Tables

Figure 9. System Level Description of the Fast Failure Recovery Methodology

COMMUNICATIONS FAILURE RECOVERY IN DATA PACKET NETWORKS BASED ON FAST DETERMINATION OF ALTERNATE ROUTES

FIELD OF THE INVENTION

The present application relates to data communications, and more specifically, to a method and system for communications failure recovery.

BACKGROUND OF THE INVENTION

In recent years, with the advent of web-based access to voice and video files on the Internet, it has been an obsession with the network engineers to develop an Internet Protocol (IP)-based packet transmission and delivery mechanism that provides end-system to end-system service reliability, while at the same time maintains the service differentiation requirements. Such a mechanism must recover from failures without any perceptible change in the transmission of data packets.

The attempts so far in the packet-switched environment has been less than encouraging. Current technologies do not meet the needs of the rapid failure recovery to the extent that users and network operators want. The providers of services and devices build their systems with enough redundant system components to ensure that during failure of an active system, a redundant system that can take all or part of the load of the active system, gets activated and maintains service continuity. The problem however lies in the fact that the changeover to the redundant system is typically very slow. If there is a route failure in a network today, the routing protocols and the associated hardware failover mechanism can take from a few seconds to a few minutes to provide the redundant route for the traffic. Such delays are not acceptable for time-sensitive traffic, such as voice and video. The delays are also not acceptable in non-time sensitive traffic such as file transfers and important transactions. The delays generally entail hardware and operational complexities not desired in most networks.

SUMMARY OF THE INVENTION

In this patent application, a methodology for fast failure recovery is presented. This methodology applies to data networks that provide many different types of traffic. The solutions provided by different vendors for rapid failure recovery are either proprietary in that they do not work with Internet Protocol (IP) and related standard routing and data transport protocols, or they are too complex and costly to deploy from user-end to user-end. The methodology presented in this patent is simple and cost-effective. The methodology is all IP-based and works with both connectionless, datagram IP as well as connection-oriented, switched IP as described in my patent application Ser. No. 09/973,884, filed Oct. 11, 2001, now U.S. Pat. No. 7,023,851, entitled "ADVANCED SWITCHING MECHANISM FOR PROVIDING HIGH-SPEED COMMUNICATIONS WITH HIGH QUALITY OF SERVICE" and incorporated herewith by reference. Switched IP comprises physical port to physical port virtual circuits, connections or channels (VCs) as presented in the above patent application.

When failure occurs in a port of a node or physical link connecting two nodes, the mechanism presented in this patent application, running in the nodes, that is, routers or IP devices, senses the failure and instantly migrates the traffic from the affected link just as quickly as possible, often within a few milliseconds or less, to an alternate link that connects this node to the next node. The minimal delay is beyond human perception, in that voice or video transmission will appear unaffected by the route failure.

The fast failure recovery technique stated here is totally scalable, operates fast and comprises lightweight processing. It is IP-based, that is, it works in layer 3 and does not require establishment of any new network layer or extraneous signaling. It provides an instantaneous failure recovery execution. The methodology makes use of the common routing protocols such as OSPF, RIP, RIP-2, IS-IS. It uses switched IP signaling only when the user or operator requires it to do so.

The methodology of fast failure recovery comprises building as fast as possible alternate traffic routes from the source node to the destination node in case of a link failure. Typically, the common routing protocols, such as OSPF, RIP-2, etc., running in a node, gather variable route metrics for the routes connected to the nodes in the process of determining the best route from the source to the destination. The routing protocol, however, provides only the best route, one with the lowest cost metric—that is, often the shortest path—from the source to the destination for a given packet flow. The routing protocol discards other (alternate) routes as unsuitable simply because of their higher total cost, for the route from the source node to the destination node. The routing protocol generally calculates the best route based on an algorithm or a mathematical formula. The fast failure recovery methodology presented in this document determines the selection of the alternate routes from the source to destination using the route metrics that the routing protocol gathers.

The fast failure recovery methodology calculates the alternate routes using the algorithm presented here. Speed is of the essence in this approach as such what is determined is an alternate route or path different from the failed path as fast as the process allows. The only criterion is the difference in the route or path metric that identifies an alternate path.

The methodology can do this in every IP device, router or node, just as the routing protocol does. The processing of the route including calculation of the best metrics for the alternate route selection is done in the background. The methodology uses the alternate routes only when the best route set-up fails. The best route selection is typically based on one route metric. This metric comprises number of hops between the source and destination that any IP packet has to traverse. A hop is the separation between a pair of nodes. The methodology presented here does not eliminate the use of any other form of metric such as bandwidth availability, its utilization, or other metrics that the routing protocol is designed to use.

A router or IP device senses the local or remote port failure when a carrier is lost or when layer 2 signaling indicates a failure. When this happens, the common routing protocol generally does not find out about this for quite some time—for several seconds to several minutes. The failure is recognized only when the protocol-initiated query message, called Hello Packet, is missed for a time duration that equals a multiple value of the Hello interval, which is the time difference between any two consecutive Hello packets. Even if the protocol mechanism in one or more routers learns about the failure in time, it needs to determine alternate routes for the packet flows, builds the route table, and then broadcast this information to all routers or devices in the network. After devices have acknowledged the alternate route information and ready to use them, then the packet flow continues over the new routes. This process is called convergence. Convergence takes time and causes delay in packet transmission. The larger the network, greater is the delay due to convergence. The failure recovery methodology described in this patent provides the algorithm for how to build the table once the common routing protocol completes a new route table.

The fast failure recovery methodology described in this patent comprises rapidly finding an alternate set of routes from the source to destination of an IP packet flow in case of a link or port failure without any perceptible loss of time such that the quality of time-sensitive service is not compromised. The failure methodology presented here works with common, connectionless IP, connection-oriented, switched IP and of course, the prevalent, common routing protocols.

The failure recovery mechanism or methodology is independent of the operating system and can use IP software or related packet processing hardware components in any IP processing device. Thus, a real-time operating system such as embedded LINUX in a network processor or a general purpose operating system such as LINUX in a general purpose router, IP-smart server or other IP devices can each comprise and use the fast failure recovery mechanism. In the paragraphs below, if it is said that the fast failure recovery methodology or mechanism executes a function or processes a parameter, it means that the associated software and/or hardware executes the function or processes the parameter for the desired end result. Typically in a router or an IP device, the routing protocol operations are executed in the route processor or engine, while the packet forwarding operations take place in the port interface or input/output cards. The fast failure recovery mechanism interfaces both the systems as and when necessary. The mechanism can also be totally hardware based, such as in a processor, which has micro-coding to execute all the functions presented in this patent application.

The fast failure recovery methodology uses route information extracted from the standard routing protocol databases built by the Open Shortest Path First (OSPF), Routing Information Protocol (RIP), RIP2, Intermediate-System-to-Intermediate-System (IS-IS), or similar other protocols in IP devices, routers or nodes for the first, second and other available alternate paths. But the routing protocols do not necessarily retain such route information except for the best route or path information as defined by the metrics they are designed or configured to use.

The fast failure recovery mechanism presented in this patent uses a unique algorithm, described here below with examples, to determine the best route metrics to enable the node or device to set up an alternate route if the best path, as set up with the help of the routing protocols, fails. This fast failure recovery algorithm works in the background to develop and maintain the alternate route listing. It does not affect the common routing protocol that continues to update its route listing or route information base as and when necessary. The route metrics are advertised in some fashion by each routing protocol. Currently, the best route selection is based on hop metric which is the number of hops between the source and destination that any IP packet has to traverse.

Still other aspects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DESCRIPTION OF THE INVENTION

Fast Failure Recovery Algorithm

Figure 1:
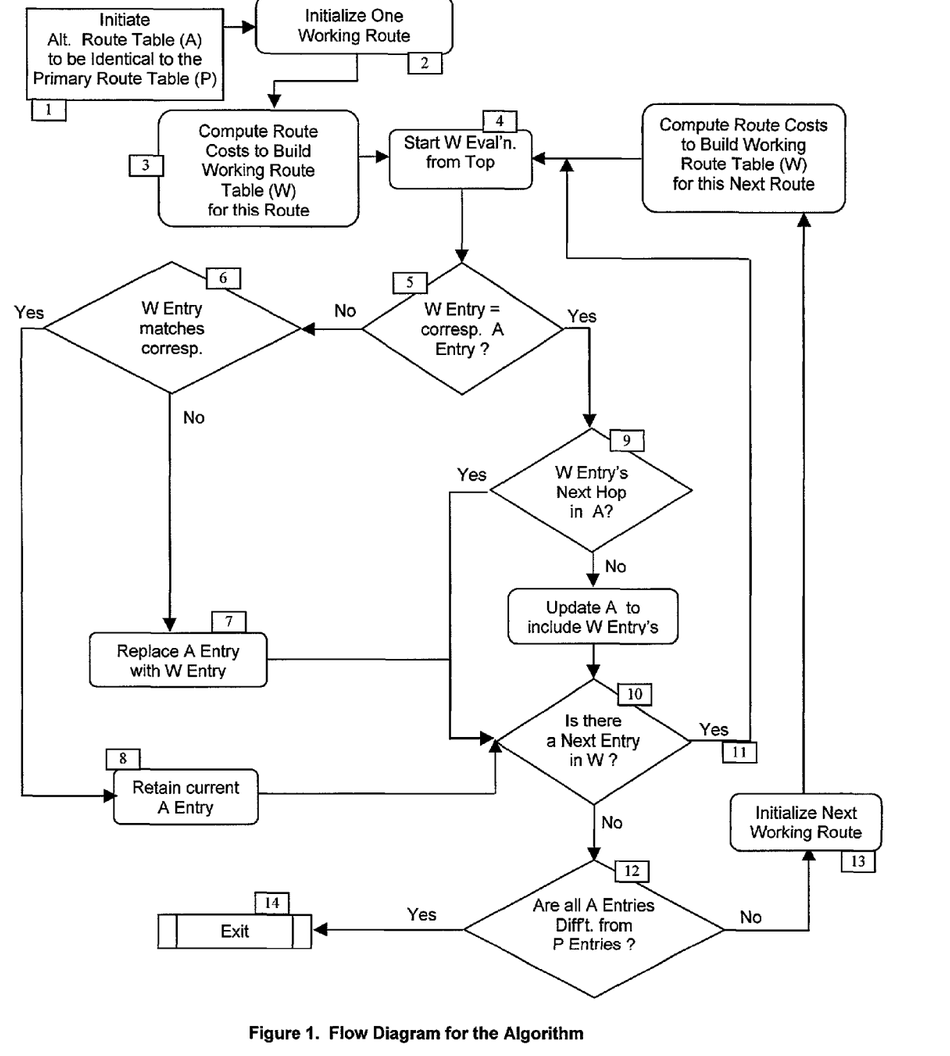
FIG. 1 is a flow diagram illustrating Fast Failure Recovery Algorithm of the present invention.

The specifics of the fast failure recovery algorithm are given here below. The network configurations and associated tables presented here indicate a sample set of steps for easy understanding of the algorithm. Step-by-step description of the algorithm in the representative example is provided below along with a flow diagram as shown in FIG. 1.

Figure 2:
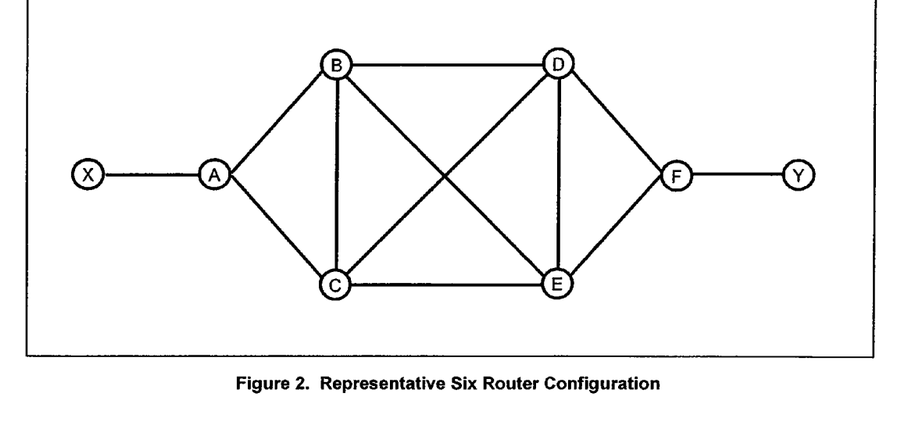
FIGS. 2, 4 and 6 represent examples of router configuration.

The representative network configuration used for the algorithm comprises six nodes or routers A, B, C, D, E and F joining two end devices or nodes X and Y as depicted in FIG. 2. All possible routes between these six nodes are connected. However, there is no requirement that the network comprise a minimum or maximum of six routers or IP devices, called nodes in this patent application, nor is it necessary to have an even or odd number of nodes or routes connecting the nodes, nor is there any need for any kind of symmetry in the arrangement of these nodes or among their connectivities.

The algorithm presented here applies to all kinds of networks that use routing protocols and comprise two or more routes connecting routers, IP devices or nodes capable of handling IP traffic and IP routing protocols. The available common routing protocol in an IP device, router or node builds the basic routing information base (RIB), that is, the database of all routes from one node to the other, using well-known algorithm such as Dijkstra's algorithm. An extraction of such a database of routes is called the route table or routing table. In this patent, it is called Primary Route Table.

The algorithm also builds a set of working route tables, each called Working Route Table which is numbered to identify the sequential numbering of these tables for easy understanding. There is another kind of table, called the Alternate Route Table, that comprises the alternate routes.

Description of the Algorithm

Figure 3:
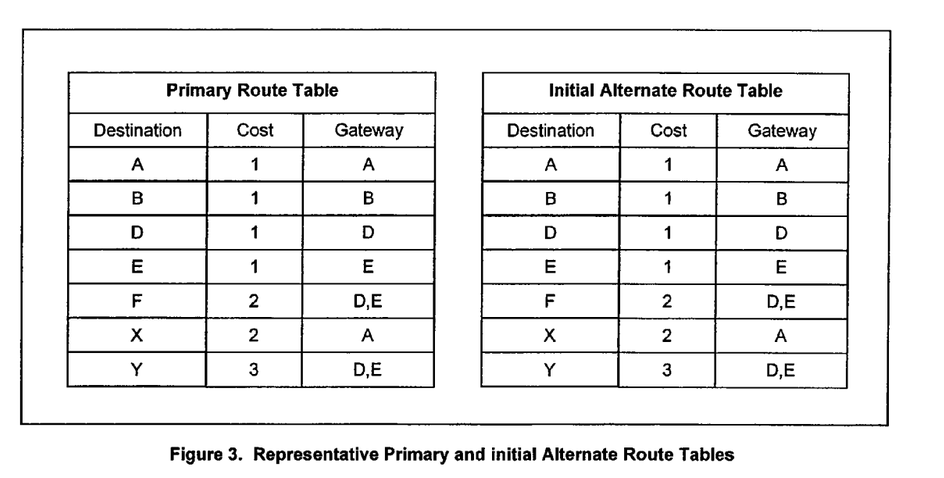
FIGS. 3, 5, 7 and 8 show examples of route tables.

The representative network configuration of FIG. 2 comprises six routers, A, B, C, D, E, and F, connecting two end devices X and Y. A representative Primary Route Table is shown in FIG. 3. For any node in the network, C in this case, the left column in the route table shows the destination node, while the cost metric, identified by hop count to the destination node, is shown in the middle column and the gateway node to the destination node is shown in the right column. The common routing protocol builds this route table or has the information that the fast failure recovery mechanism uses to build the table. In this table, typically, the sources to destination routes are shown with the best accessible intermediate gateway and route metrics. One or more of such tables exist in each router, node or IP device that sends packets, receives IP packets, processes them for best route transmission and transmits them out.

The representative tables, shown from FIGS. 3 through 8, are developed for node or router C under consideration accessing all other nodes on the network. The final goal of the algorithm is to build as fast as possible an alternate route table, called Alternate Route Table, in which all route entries have different cost metrics from corresponding entries in the Primary Route Table. The process begins with building the working route tables, called Working Route Tables. The final outcome of all route or route computations result into one final table, called Alternate Route Table that is then used to reroute packets from the failed route to the alternate route.

This mechanism for the algorithm conducts single route-specific calculation, modifies the alternate table and then does the next single route-specific calculation and continues the process. If at the completion of a route-specific calculation, in the overall series of such calculations, all the alternate table entries for a node are different from corresponding primary table entries, the mechanisms involved stop the process of calculation.

The common routing protocol collects the information necessary to build the Primary Route Table as well as route metrics that are necessary to build the Working Route Table and thereby the Alternate Route Table. Both the Primary Route Table and the initial Alternate Route Table are shown in FIG. 3 for the six router configuration as depicted in FIG. 2. There are thus three route tables: the Primary Route Table, Alternate Route Table, and Working Route Table.

The Alternate Route Table building process works as follows at the nodes that have sensed failure (See FIG. 1). The following steps describe the process.

Step 1: First initiate the Alternate Route Table, called the initial Alternate Route Table, to be identical to the Primary Route Table. See FIG. 3.

Step 2: In general, for each separate interface, initialize one working route.

Step 3: Run the route calculation, using the common shortest path algorithm or the given node's routing protocol, to build a route table, called the Working Route Table.

Step 4: Begin evaluation of the Working Route Table entries from top of the table one entry at a time.

Step 5: Determine whether the Working Route Table entry cost is the same as the corresponding Alternate Route Table entry cost.

Step 6: If not, then determine if the Working Route Table entry cost matches the corresponding entry cost in the Primary Route Table.

Step 7: If not, update the Alternate Route Table entry with the Working Route Table entry, and go to the next Working Route Table entry.

Step 8: If yes, retain the Alternate Route Table entry, go to the next Working Table entry.

Step 9: If yes, then determine if the next hop of the Working Route Table matches the corresponding entry next hop in the Alternate Route Table.

Step 10: If yes, determine if the Working Route Table has another entry,

Step 11: If yes, go to the next Working Table entry.

Step 12: If not, check if all route entries in the Alternate Route Table are different from the Primary Route Table entries.

Step 13: If not, build the next Work Route Table for the next route.

Step 14: If yes, exit the algorithm.

Figure 4:
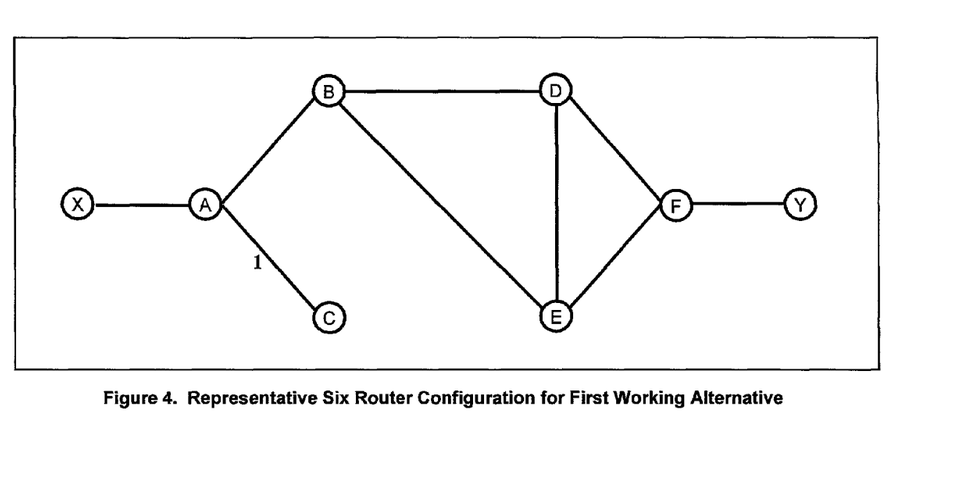

In the example presented here, the algorithm first selects route 1 as the only available route out of node C as shown in FIG. 4. The selection process of route 1 does not have to be deterministic, that is, based on such parameter as bandwidth utilization of the port or route, although it can be deterministic if so desired by the implementer of this algorithm.

The network configuration and the tables are representative samples only. However, the underlying concept and rules used apply to all cases of networks connecting IP routers, nodes and devices. Here again, C is the node or router under consideration and the tables that are built reside in this node.

Figure 5:
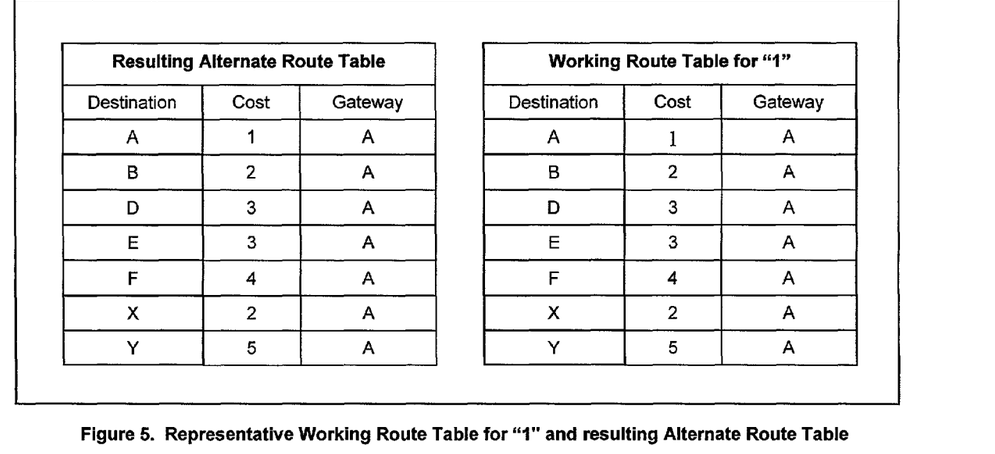

The Working Route Table resulting from the route 1 calculation is shown in FIG. 5; it is the Working Route Table for "1." It returns two original entries, that is, entries that have the same route metrics and gateway as in the initial Alternate Route Table or the Primary Route Table, as shown below. The latter two tables happen to be the same at the outset.

| A | 1 | A |
|---|---|---|
| : | : | : |
| : | : | : |
| X | 2 | A |

Figure 6:
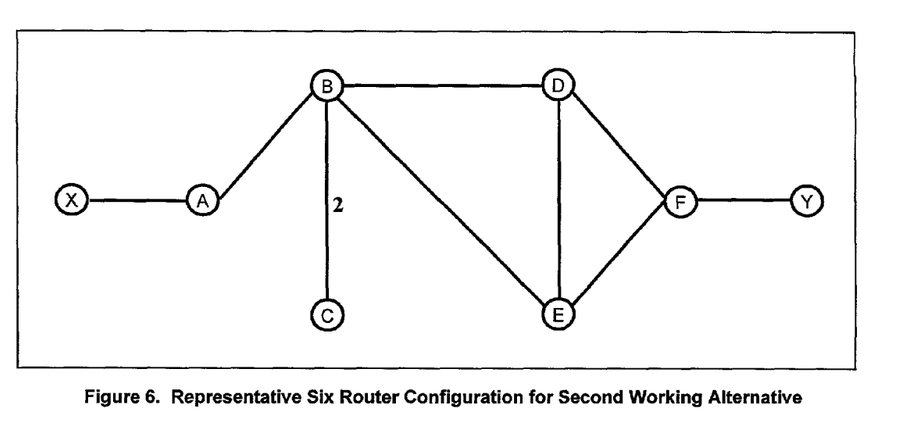
Figure 7:
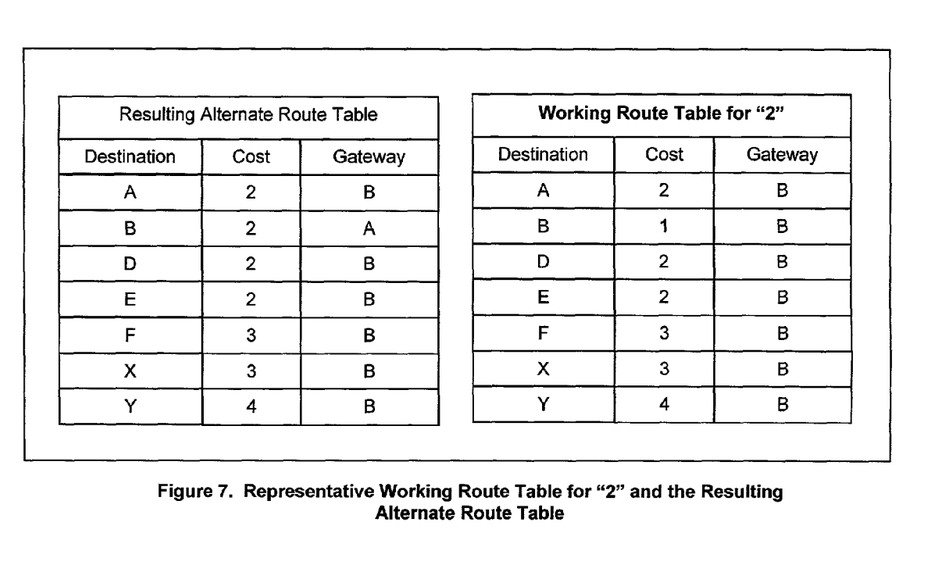
Figure 8:
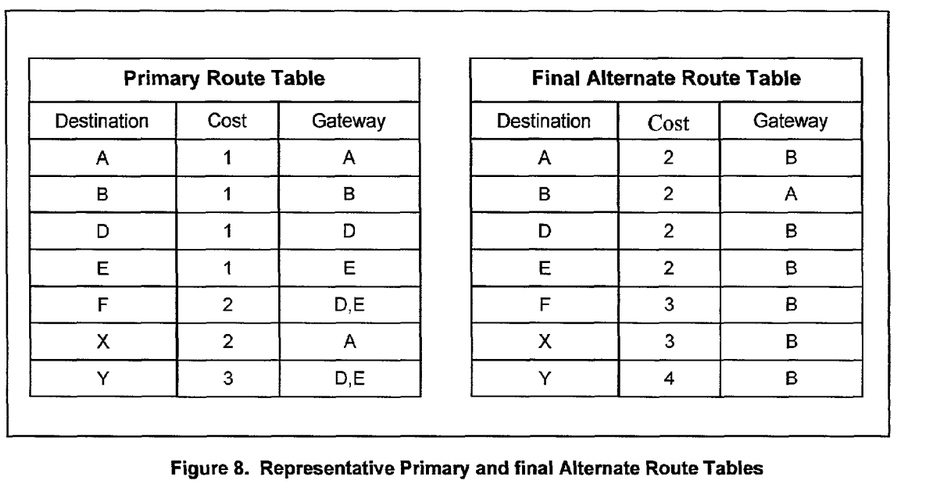

All routes other than the two entries are updated to produce the Alternate Route Table shown in FIG. 5. Since there is at least one original entry same as in the initial Alternate Route Table, the algorithm runs the route specific calculation again using C to B as the active link out of C as shown in FIG. 6. The Working Route Table for "2" in FIG. 7 shows the Working Route Table resulting from this calculation. The algorithm then updates the Alternate Route Table of FIG. 5. The second entry in the resulting Alternate Route Table in FIG. 7 now is the same as the Primary Route Table. It is therefore replaced with the corresponding one in the Working Route Table for "1" in FIG. 5. Thus, another updating of the entries take place from FIG. 5 to 7 which the algorithm keeps in FIG. 7's Alternate Route Table which then becomes the final Alternate Route Table as shown in FIG. 8 with all entries different from the Primary Route Table.

To summarize, the basic scheme in this algorithm is to follow each route table calculation with an alternate route table build in the following manner.

1. The algorithm initializes an alternate route table to be identical to the routing protocol created route information base called Primary Route Table.
2. Using neighboring node descriptor information provided by the common routing protocols, the algorithm builds a copy of this descriptor information that specifies only one of those neighbors, e.g., the first one in the primary descriptor.
3. The algorithm then runs the standard route calculation to build a working route table that reflects the local node or router as having that single neighbor. The algorithm thereafter adjusts the alternate route table to replace any routes that occur in the work table with different route metric (cost).
4. The algorithm stops as soon as all alternate route table route metrics have been changed once, otherwise it repeats steps 2 and 3 using the next neighbor specified by the primary descriptor.

System Level Description

Figure 9:
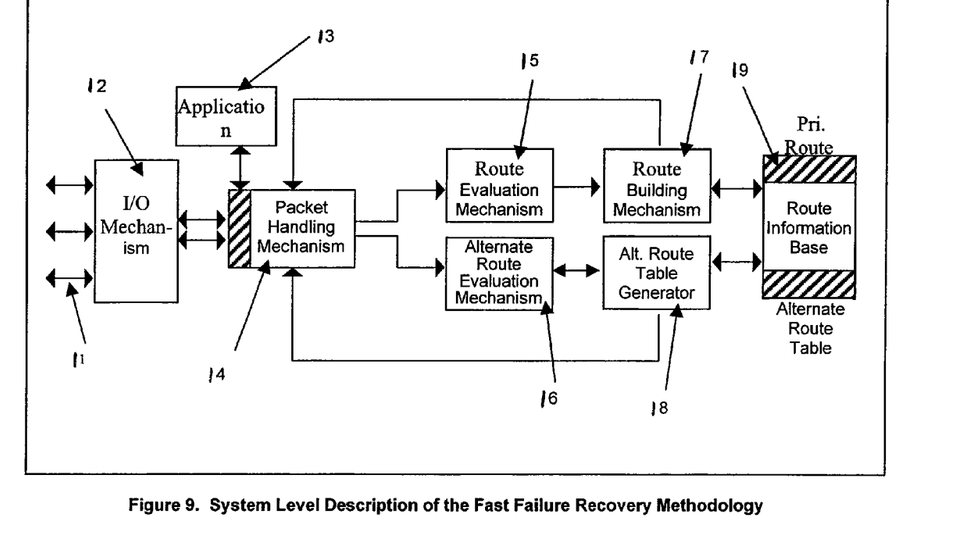
FIG. 9 illustrates exemplary embodiment of the present invention.

FIG. 9 below depicts a representative system level configuration showing how the fast failure recovery works in an IP device or router. In a true IP device or router, one or more of these systems may work as one system or as more dispersed systems and subsystems. Each of the following mechanism can be implemented in software such as one or more C code modules running on the node's operating system (OS) such as LINUX, FreeBSD, or device specific proprietary OS; examples of the device specific OS would be Cisco's IOS or Microsoft's Windows. The systems can also be integrated as part of one or more processors or firmwares. The processor could be a network processor such as Intel's IXP1200, application specific integrated circuit (ASIC) or field programmable gate array (FPGA). Such chips generally have both a central processing unit (CPU) along with one or static and dynamic memory components, such as SRAM and SDRAM.

The significant, representative system components presented in this patent application are the I/O Mechanism 12, Packet Handling Mechanism 14, Route Evaluation Mechanism 15, Alternate Route Evaluation Mechanism 16, Route Building Mechanism 17, Alternate Table Generator 18, and the Route Information Table 19. The detailed functionality of each is presented below that in their totality represent the processing sequence involving flow of packets for the fast failure recovery as described below. The component 11 identifies the flow of packets in and out of IP device or router and is not a hardware or software component.

12 I/O Mechanism

This is the input-output mechanism for handling packets going out or coming into the IP device and insertion or removal of packet headers for layers 1 and 2 before the layer 3 IP processing.

13 Application Systems

This mechanism incorporates hardware and software tools that interact with the user and the Packet Handling Mechanism 14. This is where the common routing protocols such as OSPF, RIP-2 or IS-IS reside and build the basic route information base and passes that to the kernel of the OS.

14 Packet Handling Mechanism

This is the mechanism that incorporates packet processing with regard to queuing of packets and interfaces to applications such as the routing protocols for the other mechanisms in the system. After the IP packet has been received, this mechanism comes into play. This is generally a layer 3 mechanism. It uses the information from the Route Building 17 and Alternate Route Table Generator 18 mechanisms to queue packets for transmission out of the IP device or router.

15 Route Evaluation Mechanism

This is where the route table look-up is done for determining available best route for packet transmission. This route look-up may involve looking into the routing or switching table for the best virtual connections (VCs), in other cases, it may involve looking up the routing tables such as the Route Information Base (RIB) for packet by packet route look-ups.

16 Alternate Route Evaluation Mechanism

This mechanism helps evaluate the alternate routes for a packet or packet flow. The mechanism 16 compares the Working Route Table entries with the Alternate Route Table entries and when necessary, with the Primary Route Table entries.

17 Route Building Mechanism

This mechanism builds the route tables using the common routing protocols or similar other methodologies that include information gathered from exchanging route characteristic query messages between two or more IP devices or routers.

18 Alternate Route Table Generator

This is the mechanism builds the Alternate Route Table in conjunction with the Alternate Route Evaluation Mechanism 16. This mechanism therefore executes that part of the algorithm that is used to build Alternate Route Tables until the final Alternate Route Table is built.

19 Route Information Base

This is where all the route tables and related information are stored for dynamic and extended usage. This is built from the information available from common routing protocols such as OSPF, RIP-2, IS-IS, etc., as desired by the network operator.

The process flow for the fast failure recovery comprises the sequence of processes in mechanisms identified here above. The description does not necessarily address other packets that contain the packet payload of data, voice, video, transaction, or other information. The processes can all or partly be in the software kernel of the IP device or router. They can also be partly in the application space of the software. In case of the processor as well as in case of a general purpose IP device such as a computer or hand-held device, part of the mechanisms could be handled by the CPU interacting with the various memories of the processor.

When it is stated in the process description below that certain information is accessed from the arriving packet, it implies that, in case of FreeBSD OS based system, the information is obtained by a calling function from a data structure such as mbuf; mbuf is a data structure that contains the various variables representing different characteristics of the packet and information therein. In case of LINUX OS, this would be the skbuf structure that has slightly different configuration from the mbuf structure but essentially provide the same information. Often, it is a chain of mbufs that represent a packet, while one skbuf structure represents a packet since it can be of a flexible size. Furthermore, the I/O Mechanism 12 is more likely would be a device driver software module resident in the port interface hardware. The device drives typically controls and manages the hardware port, and also interfaces with the kernel of the device. Different IP devices and routers have different hardware and software configurations but for all practical purposes, this description should provide a meaningful representation.

When packets arrive at the IP device, the I/O Mechanism 12, typically the device driver, processes the packet to ensure the packet was meant for this device and ensures the communication synchronization necessary at this stage of packet handling. This I/O Mechanism 12 executes the standard layer 1 and 2 processes.

The packet is then accessed by the Packet Handling Mechanism 14 from the input queue. This mechanism 14 determines if the packet is a typical layer 3 routing protocol packet. If it is a IP routing protocol packet, then this mechanism 14 passes the available path's information to the Route Evaluation Mechanism 15. The Route Evaluation Mechanism 15 uses the route information thus obtained to compare it with the route information already available. The Route Evaluation Mechanism 15 determines if the route information just received is for a route update, if so the RIB is updated as necessary, which is used to update the Primary Route Table.

The Route Building Mechanism 17 uses the new route information and the protocol's route building algorithm. The updated route information is then accessed by the Packet Handling Mechanism 14 for packet transmission out to other IP devices or routers as the case may be via the I/O Mechanism 12.

At the same time that the Route Building Mechanism 17 builds the RIB 19 and the Working Route Table, the Alternate Table Generator 18 uses all the available information gathered by the Route Building Mechanism 17 or that available in the RIB 19 to build the Alternate Route Table. The Alternate Table Generator 18 generates the Primary Route Table from the RIB, initializes the Alternate Route Table by entering the Primary Route Table next hop parameters in this table.

When a route failure occurs, it is sensed by the I/O Mechanism 12 because of the carrier absence, cessation of data packet flows, manual intervention, or some such event. The Packet Handling Mechanism 14 finds about it because it continuously polls the I/O Mechanism 12 at a very high frequency. The Packet Handling Mechanism 14 alerts the Alternate Route Building Mechanism 16 which evaluates the situation by querying Packet Handling Mechanism 14 to see if there are any current packet flows or sessions in progress. If yes, it asks the Alternate Table Generator 18 to pass the alternate route information to Packet Handling Mechanism 14 so to allow the sessions or existing flows to be rerouted on the alternate paths.

When the failed routes are repaired and available, the incoming updates help the Route Evaluation Mechanism 15 to ask Route Building Mechanism 17 to update the routes in RIB 19. The Alternate Route Evaluation Mechanism 16 also finds out about it from the Packet Handling Mechanism 14 but the Alternate Route Evaluation mechanism 16 makes sure that current, active packet flows or sessions are not brought back to the repaired best path, that is, the Alternate Table Generator 18 does not send the route information to Packet Handling Mechanism 14 for the active flows once it has run the alternate route building algorithm again from the new route information from the RIB 19.

Both the Route Building Mechanism 17 and the Alternate Route Table Generator 18 provide proper route information to the Packet Handling Mechanism 14 as the situation requires. They do not handle the packet flows themselves.

When a packet arrives from the Application Systems 13, it is handled in a way similar to the I/O packet handling by the Packet Handling Mechanism 14. The only difference is that this packet is not queued with incoming out-of-the-device packets. However, when this packet has to be sent out, it is queued with the outgoing packets meant for the I/O Mechanism 12.

The Route Evaluation Mechanism 15 sends information to the Route Building Mechanism 17 for the latter to build routes using the well-known routing protocol algorithms and populate the RIB 19 which is what is identified as the Primary Route Table in the description of the algorithm above. The Alternate Table Generator 18 applies the fast failure recovery algorithm to the route information that is available from the route information table.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method of data communications in an IP packet switching network, the method comprising the steps of:
   at a first node, sensing communications failure in the IP packet switching network,
   determining the best route for delivering an IP packet from the first node to a destination, and
   if the best route is not available, providing an alternate route that includes a link from the first node to a second node adjacent to the first node, but does not include a link from the second node to a third node, the link from the first node to the second node being determined without requiring pre-calculation of a route to the destination,
   the alternate route being provided to deliver the IP packet to the destination, so as to resume as fast as possible data transmission interrupted due to the communications failure.

2. The method of claim 1, further comprising the step of producing a primary route table for storing routes.

3. The method of claim 2, wherein each entry in the primary route table represents a route from a local node to a destination.

4. The method of claim 3, further comprising the step of producing an alternate route table for storing alternate routes having cost different from primary routes, initial entries of the alternate route table being identical to entries of the primary route table.

5. The method of claim 4, further comprising the step of producing a working route table for storing intermediate results of route evaluation.

6. The method of claim 5, further comprising the step of evaluating each entry of the working route table to determine whether each entry of the alternate route table is the same as a corresponding entry in the working route table.

7. The method of claim 6, wherein, if a particular entry in the working route table is different from the corresponding entry in the alternate route table, the step of building the alternate route further comprises the step of determining whether the same entry in the working route table corresponding to the particular entry of the alternate route table is different from the corresponding entry in the primary route table.

8. The method of claim 7, wherein, if the entry in the working route table corresponding to the particular entry of the alternate route table is different from the corresponding entry in the primary route table, the step of building the alternate route further comprises the step of replacing the particular entry in the alternate route table with the corresponding entry in the working route table.

9. The method of claim 7, wherein, if the entry in the working route table corresponding to the particular entry of the alternate route table is not different from the corresponding entry in the primary route table, the step of building the alternate route further comprises the step of maintaining the current entry in the alternate route table.

10. The method of claim 6, wherein if a particular entry in the alternate route table is the same as the corresponding entry in the working route table, the step of building the alternate route table further comprises the step of determining whether a next hop for an entry in the working route table is different from the next hop for the corresponding entry in the alternate route table.

11. The method of claim 10, wherein, if the next hop for an entry in the working route table is different from the next hop for the corresponding entry in the alternate route table, the step of building the alternate route further comprises the step of replacing the next hop of a particular entry in the alternate route table with the corresponding next hop entry in the working route table.

12. The method of claim 8, further comprising the step of replacing the particular entry in the alternate route table with the corresponding entry in the working route table, and the step of determining if the next entry in the working route table exists.

13. The method of claim 9, further comprising the step of maintaining the current entry in the alternate route table the step of building the alternate route further comprising the step of determining if the next entry in the working route table exists.

14. The method of claim 11, further comprising the step of replacing the next hop of a particular entry in the alternate route table with the corresponding next hop entry in the working route table, the step of building the alternate route further comprising the step of determining if the next entry in the working route table exists.

15. A data communications system comprising in a first node:
   a route evaluation mechanism responsive to an IP packet for determining the best route for delivering the packet to a destination, and
   an alternate routing mechanism responsive to the IP packet for determining an alternate route that includes a link from the first node to a second node adjacent to the first node, but does not include a link from the second node to a third node, the link from the first node to the second node being determined without requiring pre-calculation of a route to the destination, the alternate route being determined so as to deliver the packet to the destination, the packet being routed via the alternate route if the best route is not available.

16. The system of claim 15, wherein the IP packet is externally supplied to the node.

17. The system of claim 15, wherein the IP packet is produced inside the node.

18. The system of claim 15, wherein the alternate routing mechanism comprises an alternate route evaluation mechanism for evaluating possible routes for packet delivery that are different from the best route.

19. The system of claim 18, wherein the alternate routing mechanism further comprises an alternate route table generator responsive to evaluation performed by the alternate route evaluation mechanism for producing route tables containing routes for delivery of the packet to the destination.

20. The system of claim 19, wherein the alternate route table generator is configured for producing a primary route table containing the best route for delivery of packets to the destination, and an alternate route table containing alternate routes different from the best route.

21. The system of claim 20, wherein the alternate routing mechanism is configured for determining, for a particular node, routes from that particular node to other nodes based on only one route from that particular node.

22. The system of claim 21, wherein the alternate routing mechanism is further configured for determining the cost until all routes from that particular node differ from the best route.

23. The system of claim 22, wherein the alternate route table generator is configured for producing the alternate route table containing alternate routes different from the best routes.

* * * * *